(12) United States Patent
Adelbert

(10) Patent No.: US 7,969,286 B2
(45) Date of Patent: Jun. 28, 2011

(54) PROCESS AND SYSTEM FOR AUTOMATICALLY UPDATING DATA RECORDED IN A RADIO FREQUENCY IDENTIFIER

(75) Inventor: Santie V. Adelbert, Vincennes (FR)

(73) Assignee: Eastman Kodak Company, Rochester, NY (US)

( * ) Notice: Subject to any disclaimer, the term of this patent is extended or adjusted under 35 U.S.C. 154(b) by 937 days.

(21) Appl. No.: 11/866,419

(22) Filed: Oct. 3, 2007

(65) Prior Publication Data

US 2008/0084293 A1    Apr. 10, 2008

(30) Foreign Application Priority Data

Oct. 5, 2006    (FR) ...................................... 06 08705

(51) Int. Cl.
*H04Q 5/22* (2006.01)
(52) U.S. Cl. .............. 340/10.51; 340/10.52; 340/825.22
(58) Field of Classification Search ............. 340/825.22, 340/572.1, 10.1, 10.51, 10.52; 234/375–385, 234/592; 235/375–385
See application file for complete search history.

(56) References Cited

U.S. PATENT DOCUMENTS

| 7,360,714 B2* | 4/2008 | Sano et al. ..................... 235/492 |
| 7,416,122 B2* | 8/2008 | Sato ............................... 235/385 |
| 7,609,406 B2* | 10/2009 | Roth et al. ..................... 358/1.15 |
| 7,772,964 B2* | 8/2010 | Tethrake et al. ............. 340/10.51 |
| 2001/0037504 A1* | 11/2001 | Lee et al. .......................... 725/60 |
| 2002/0046122 A1* | 4/2002 | Barber et al. .................... 705/17 |

FOREIGN PATENT DOCUMENTS

WO  WO 2006/011729 A1   2/2006

* cited by examiner

*Primary Examiner* — Benjamin C Lee
*Assistant Examiner* — Peter C Mehravari
(74) *Attorney, Agent, or Firm* — Jean-Marc Andre

(57) ABSTRACT

The invention is intended to be used in the technological field of communication and the update of data between electronic equipment (1, 2) capable of inter-communicating using wireless links. The invention relates more particularly to a process and a system to automatically configure and update the data saved in a radio frequency identifier (3). The process and the system enable the update of the data recorded in a radio frequency identifier of a first equipment item (1) equipped with a display screen (5) by displaying on screen a visual code (7) bearing update data of the radio frequency identifier. The visual code is then read using a second equipment item (2) provided with a visual code read device (4) having radio frequency identifier read-write interface. Then, the decoding of the visual code and the conversion and transmission of the update data to the radio frequency identifier by means of the read-write interface are performed.

14 Claims, 1 Drawing Sheet

PROCESS AND SYSTEM FOR AUTOMATICALLY UPDATING DATA RECORDED IN A RADIO FREQUENCY IDENTIFIER

CROSS REFERENCE TO RELATED APPLICATIONS

This is an application claiming priority to French Patent Application Serial No. 0608705, filed Oct. 5, 2006.

FIELD OF THE INVENTION

The invention is intended for the technological field of communication and the update of digital data between electronic equipment capable of inter-communicating using wireless links. The invention relates more particularly to a process and a system to automatically configure and update digital data saved in a radio frequency identifier.

BACKGROUND OF THE INVENTION

The variety and multiplicity of electronic equipment or devices capable of inter-exchanging coded or non-coded digital data make the pairing of this equipment difficult. This equipment can inter-communicate using wireless links, which happens when data exchanges take place using Internet type networks. For short distance exchanges, Bluetooth or Wireless Fidelity (Wi-Fi) links are frequently used.

Recognition protocols exist enabling the recognition, based on an equipment item or a terminal, of neigh boring terminals, including those that said equipment user does not know. Neighboring terminals are, for example, displayed on a display screen of the equipment.

To facilitate the interaction and data exchanges between these terminals, processes exist so that the equipment pairs easily, i.e. so that they can inter-exchange data or so that they can update the data in one of the equipment items, from another equipment item. Thus one can pair, for example, two mobile phones, or a mobile phone with a printer, or a phonecam with a photographic kiosk.

Known processes of the state of the art describe radio frequency wireless identifier means, like for example radio frequency identification (RFID) transponders or visual identifier means, like barcode labels with one or two dimensions. Or even, hybrid identifiers, as described in International Patent Application WO 2006/011729 A1.

Radio frequency identifier technology, RFID, is standardized through standards and based on the use of radio frequencies. It requires particular radio frequency identifier means and associated read device (or interrogators) that can operate in different frequency bands, for example low frequencies, or high frequencies.

RFID transponders can be radio frequency identifiers specific to an equipment item. The equipment is, for example, a printer or photographic kiosk equipped with an image printing unit. In this case, these radio frequency identifiers contain recorded digital data, like for example the coded address of the equipment in a communication network. A radio frequency identifier comprises a support, for example self-adhesive, a chip equipped with a microprocessor, an antenna and, possibly, an energy source such as a battery. Radio frequency identifiers that are energy self-sufficient are called "active." Thus the radio frequency identifier can be energy self-sufficient. The chip of the radio frequency identifier also comprises a memory to record digital data, like for example an equipment identifier. An active read-write device of the radio frequency identifier can interact with the radio frequency identifier by means of inductive coupling at preset frequencies (low, high, or ultra-high frequencies), by recognizing and decoding a carrier signal of information specific to the radio frequency identifier. The active read-write device of the radio frequency identifier comprises a signal transmitter that activates the radio frequency identifier when it is for example approached to a few centimeters, or a few tens of centimeters from the radio frequency identifier. By the means of an electromagnetic field inherent to this inductive coupling, the active radio frequency device can thus read the digital data recorded in the radio frequency identifier, and write or modify, i.e. update the digital data recorded in the radio frequency identifier.

The RFID technology, implemented with processes and systems using RFID transponders, in particular can enable the easy and rapid identification, for example of equipment or a packaging product that is equipped with a radio frequency identifier. However, a disadvantage remains in relation to the configuration and updating of radio frequency identifiers. These configuration and updating operations also require having an active read-write device of the radio frequency identifier. The active read-write device executes operations of reading digital data recorded in the radio frequency identifier and writing or modifying these digital data.

For cost reasons, equipment or products each bearing their specific radio frequency identifier are not generally each equipped with their own radio frequency read-write device, as the cost of the radio frequency read-write device is substantially higher (ten times higher on average) than that of the radio frequency identifier.

Furthermore, even if a single radio frequency read-write device is used to couple with a plurality of radio frequency identifiers, the above-mentioned disadvantage remains, which is that of the configuration and updating of data that require inputting, in the active radio frequency read-write device, the various packets of data recorded in the radio frequency identifier. The data are entered manually into the read-write device, which requires long and demanding manual input operations that are moreover subject to errors. Therefore, it is desirable to avoid this data inputting into the radio frequency read-write device.

Radio frequency identifiers of the state of the art have a lifetime of several years and are configured once, to be operational, for example in a system comprising electronic equipment equipped with radio frequency devices. When these radio frequency identifiers have to be updated, for the digital data that they contain, a manual intervention is required using a specific device, which is, for example, a RFID reader. Thus, the RFID reader must be updated to then work together, by a radio link, with the radio frequency identifier and update the latter's data. The above-mentioned disadvantage is that, when a data update of the radio frequency identifier has to be performed, the update data are input manually into the radio frequency read-write device (or RFID reader) and require a number of more or less complex operations, therefore costly, and introducing risks of inputting errors.

SUMMARY OF THE INVENTION

The purpose of the invention is to remedy the above-mentioned disadvantages of the state-of-the-art.

The object of the invention is a process and system based on radio frequency devices intended both to identify equipment, like for example a printer or a photographic kiosk, each of the equipment items being provided with a radio frequency identifier, and, radio frequency devices intended to read visual codes and update data in the radio frequency identifiers. The objective is to automatically configure and update data saved in the radio frequency identifier, without performing manual operations of inputting data into the read-write device. The operation of updating data specific to the invention includes the operations of writing new data and modifying existing data.

It is a particular object of the invention to provide a process of updating data recorded in a radio frequency identifier from a first equipment item provided with a display screen comprising the following steps:
  a) screen display of visual code bearing update data of the radio frequency identifier;
  b) reading of the visual code using a second equipment item provided with a visual code read device having a radio frequency identifier read-write interface;
  c) decoding of the visual code and conversion and transmission of update data to the radio frequency identifier by means of the read-write interface.

The data recorded in the radio frequency identifier are preferably digital data.

In an advantageous embodiment of the invention, the visual code also comprises the data of an executable program intended for the second equipment item and comprising automatic execution instructions for steps b) and c) described above. The visual code is a barcode or a two dimensional (or 2D) code.

In particular embodiments of the invention, the first equipment item provided with a radio frequency identifier is a photographic kiosk equipped with an image printing unit and the second equipment item is a digital camera or digital phonecam.

According to a preferred embodiment of the invention, the radio frequency identifier is a radio frequency identification (RFID) transponder and the visual code read device and the radio frequency identifier read-write interface form an active RFID transponder that can transmit radio waves to read and write digital data recorded in the RFID transponder. The radio frequency identifier reader can be, for example, a near field communication (NFC) reader.

The process according to the invention is the updating of data recorded in the radio frequency identifier by executing various operations. First, the update of data can be an operation of updating the content of the identification data of the first equipment item. The update of the data content can also be a hardware configuration operation of data specific to the physical processing or storage units of the first equipment item. "Physical unit" means, for example, microprocessor, memory, bus, keyboard, display screen, disk unit. However, the update of the data content can also be a software configuration operation of data specific to the programs implemented with the first equipment item.

The update of the data content can also be a hardware configuration operation of data specific to equipment that can be connected to the first equipment item. An example of equipment capable of being connected to the first equipment item is advantageously a phonecam; the connection being made with a wireless link, for example of Bluetooth type.

According to an embodiment intended to preserve the security of recorded data, data updating can advantageously be an updating operation of the content of encryption data.

The present invention also relates to a system comprising a first equipment item provided with a display screen and a radio frequency identifier, like for example a RFID transponder; a second equipment item, preferably mobile, capable of being put into radio communication with the first equipment item, the second mobile equipment item comprising a radio frequency device, like for example an active RFID transponder, to update digital data recorded in the radio frequency identifier according to one of the embodiments of the process described above.

Other characteristics and advantages of the invention will appear on reading the following description, with reference to the figure.

DETAILED DESCRIPTION OF THE INVENTION

Figure 1:
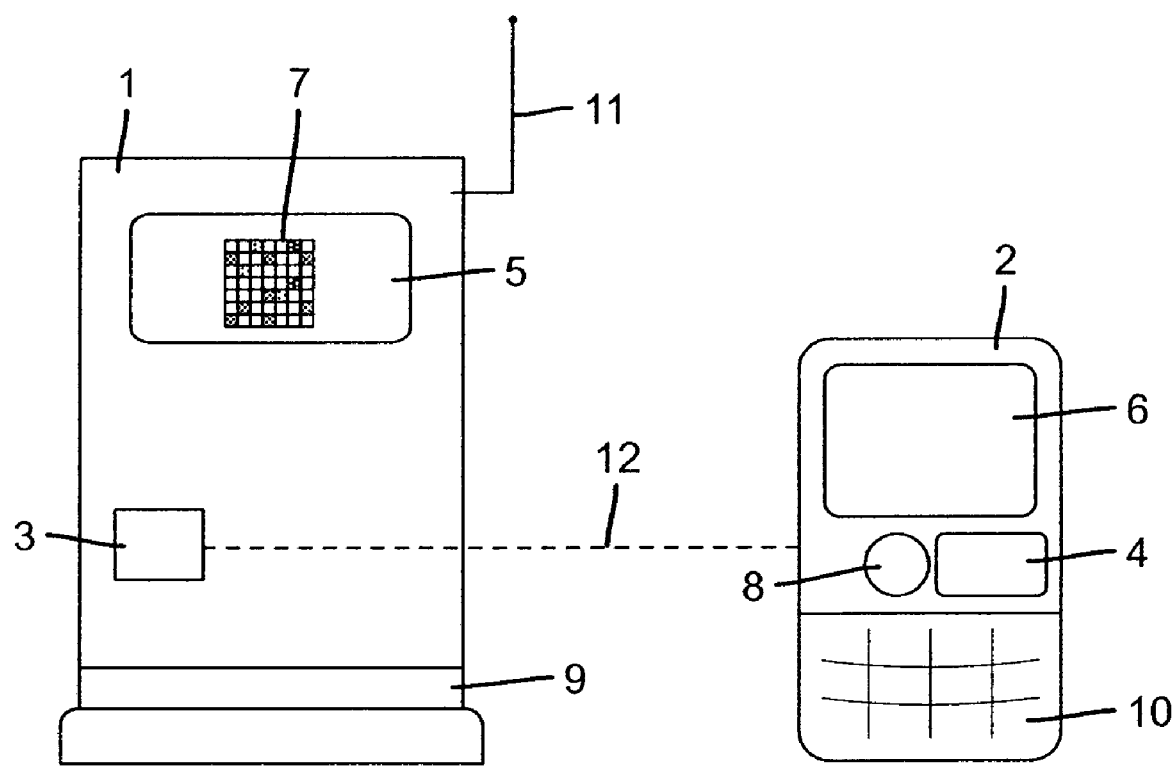
FIG. 1 schematically represents a preferred embodiment of implementing the invention.

The following description is a detailed description of the invention, with reference to the drawing of FIG. 1.

The configuration and update of a radio frequency identifier (RFID) requires first inputting, using a radio frequency read device (or RFID reader), update data that correspond with the data saved in the radio frequency identifier. The RFID reader transmits the signal appropriate for, secondly, writing modified or new data in the radio frequency identifier, to perform an update of the data saved in the latter. The RFID must be in the reading field of the RFID reader. The RFID can only be read, write once read many (WORM) type, or can be rewritten, i.e. liable to be updated for the data it contains. The RFIDs implemented in the invention are identifiers that can be rewritten.

The data saved in the radio frequency identifier characterizes, for example, the identifier of an equipment item associated with the radio frequency identifier, hardware and software specific to the equipment.

The system in which the invention is implemented can comprise diverse electronic equipment, like for example terminals such as a personal computer (PC), television set, mobile phonecam, personal digital assistant (PDA), digital display screen. Every electronic equipment item is identified with a radio frequency identifier. The radio frequency identifier is affixed to the equipment; the identifier is, for example, stuck with one or several self-adhesive strips onto the equipment. The radio frequency identifier contains a memory, in which data are recorded. The recorded data generally contain data intended to identify the equipment on which the radio frequency identifier is affixed. But, the recorded data can advantageously contain other data, like data specific to each of the physical units characterizing the hardware structure of the equipment. A physical unit contributes especially to the processing and storage of data managed by the equipment. A physical unit is, for example, for a PC: processor, central memory, local bus, disk, or sound card and screen. The recorded data can also contain data specific to the software implemented with the equipment. This software is, for example, for a PC: operating systems or specific application software.

In a particular embodiment, the recorded data can comprise data specific to other connected equipment capable of exchanging data with the equipment bearing the electronic identifier.

In another particular embodiment where data security constraints intervene, the recorded data can comprise encryption data, to encode information and make it unintelligible. In this case, the encryption key can also be recorded in the identifier.

Electronic equipment used to implement the invention advantageously has the capacity to produce and display visual codes. A visual code is a pattern or symbol such as a barcode or a two dimensional (or 2D) code. The capacity to produce and display a visual code with the equipment is realized using equipment-specific software. The objective of this visual code is to identify something with a pattern having a unique representation of elementary modules. A 2D code can thus encode several thousand bytes of data with a unique symbol; the symbol can include alphanumeric, digital, or binary data. Advantageously, the visual code can be self-contained, i.e. contain configuration parameters to be able to be adapted to the equipment it is displayed on. 2D codes can be read, for example, by a digital camera that comprises a 2D visual code read device. The camera also comprises a read-write module of radio frequency data that is advantageously integrated into the camera case. The camera also has decoding software capable of converting the visual data captured by the camera, for example into digital data. The camera-specific software enables the digital data to be sent to the read-write module integrated into the camera.

FIG. 1 schematically represents a first preferred embodiment of implementation of the invention. A first equipment item 1 is provided with a display screen 5. The first equipment item 1 comprises a radio frequency identifier 3. The radio frequency identifier 3 is advantageously integrated within the case of the equipment 1. The equipment 1 can also comprise a printing module 9 providing the printer function. The equipment 1 is, for example, a photographic kiosk, for processing digital images and printing them with the printer 9. The processed digital images are, for example, downloaded into the kiosk 1, from a mobile terminal having previously acted to capture the images.

As described above, the capacity to produce and display a visual code 7 with the equipment 1 is realized using software specific to equipment 1. The visual code 7 is, for example, a 2D code that contains update data intended for the radio frequency identifier 3. The update information conveyed by the visual code 7 is supplied for example using a wireless link 11. The link 11 enables a connection of the equipment 1 in a network comprising, for example, an update data server (not represented on FIG. 1). In an environment of mobile equipment or terminals, the link 11 is advantageously a Bluetooth or Wi-Fi link.

A second equipment item 2 especially comprising an image sensor 8 to capture digital images and a visual code read device having a radio frequency identifier read-write interface 4. The visual code read device having a radio frequency identifier read-write interface 4 is advantageously integrated within the case of the equipment 2. The second equipment 2 is, for example, a digital camera equipped with a keyboard 10 and a display screen 6. However, the second equipment item 2 can also be a phonecam integrating in its case, the visual code read device having a radio frequency identifier read-write interface 4. The second equipment 2 is configured with software for translating or converting, for example into digital data, a visual code captured with the camera 2. The camera-specific software 2 enables the digital data to be sent to the read-write module 4 integrated into the camera 2.

The visual code 7 is sent to the equipment 1 by the link 11. Then, the visual code 7 is displayed on the screen 5 of the equipment 1. The equipment 2 enables the visual code 7 to be captured by the image sensor 8. Then, the visual code 7 containing the update data is read, decoded and converted with the conversion software and the visual code read device having a radio frequency identifier read-write interface 4; then, the update data are transmitted by a radio communication link 12 to the radio frequency identifier 3. The equipment 2 enables the capture of an image of the visual code 7 displayed on the screen 5 of the equipment 1, and the equipment 2, provided with the active transponder 4, sends an update signal to the chip of the transponder 3.

In a preferred embodiment, the visual code also comprises the data of an executable program intended for the equipment 2 and comprising automatic execution instructions for the steps of reading and decoding of the visual code, and the conversion and transmission of update data to the radio frequency identifier 3.

A second embodiment of the implementation of the invention (not represented by a figure) consists, for example, in updating the data specific to a printer. From a PC, the visual code 7 bearing the update data is collected, for example, from an Internet site address, then displayed on the PC's screen. Then, the visual code is captured with, for example, a mobile or portable phonecam equipped with an image sensor and the visual code is decoded, converted and transmitted with a visual code read device having a radio frequency identifier read-write interface integrated into the phonecam. Then, the update data are sent to a radio frequency identifier specific to the printer by a radio link made between the phonecam and the printer. In the case of a first configuration of the printer, the update data can consist in completing the fields of the memory of the printer's radio frequency identifier.

In a particular embodiment of the invention, the RFID transponder 3 of the equipment 1 and the active RFID transponder 4 of the equipment 2 are respectively near field communication (NFC) type. NFC technology is a particular application of radio frequency link that can be used advantageously in a mobile environment, i.e. a system comprising mobile or portable terminals in which RFID transponders are integrated. The NFC application operates in the high frequency area, i.e. 13.56 MHz (megahertz).

While the invention has been described with reference in particular to its preferred embodiment, it is apparent that the presented embodiment is illustrative and non-restrictive as regards the claimed protection; the claimed protection can cover variants and modifications corresponding to the invention's object and which can be added within the scope of the claims.

The invention has been described in detail with particular reference to certain preferred embodiments thereof, but it will be understood that variations and modifications can be effected within the scope of the invention.

PARTS LIST 1. first electronic equipment item
2. second electronic equipment item
3. radio frequency identifier
4. visual code read device having a radio frequency identifier read-write interface
5. display screen of the first equipment item
6. display screen of the second equipment item
7. visual code
8. image sensor
9. printing module
10. keyboard
11. wireless link
12. radio communication link

The invention claimed is:

1. A process of updating data recorded in a first radio frequency identifier comprised in a first equipment item, the first equipment item being provided with a display screen, the process comprising the following steps:
   a) sending to the first equipment item, by a first link enabling a connection of the first equipment item in a network, a visual code that contains some update data intended for the first radio frequency identifier comprised in the first equipment;
b) displaying the visual code bearing the update data of the radio frequency identifier on the display screen;
c) using a second equipment item comprising an image sensor and a visual code read device, the visual code read device having a second radio frequency identifier read-write interface for reading the visual code with said second radio-frequency identifier read-write interface, after an image of the visual code displayed on the display screen has been captured with the image sensor of the second equipment item;
d) decoding the visual code captured with the second equipment item, converting the decoded visual code into the update data, and transmitting the update data to the first radio frequency identifier by means of the second radio frequency identifier read-write interface and a second radio communication link.

2. The process of updating data according to claim 1, wherein the visual code also comprises the data of a program executed on the second equipment item, the program comprising automatic execution instructions of step d) of claim 1.

3. The process of updating data according to claim 1, wherein the visual code is a barcode, or a two dimensional code.

4. The process of updating data according to claim 1, wherein the update of the data is an update of a content of identification data of the first equipment item, the identification data being recorded in a memory of the first radio frequency identifier.

5. The process of updating data according to claim 1, wherein the update of the data is an update of a content of encryption data, the encryption data being recorded in a memory of the first radio frequency identifier.

6. The process of updating data according to claim 1, wherein the update of the data is an update of hardware configuration data specific to a physical processing or storage units of data of the first equipment item, said hardware configuration data being recorded in a memory of the first radio frequency identifier.

7. The process of updating data according to claim 1, wherein the update of the data is an update of hardware configuration data specific to an equipment capable of being connected to the first equipment item, said hardware configuration data being recorded in a memory of the first radio frequency identifier.

8. The process of updating data according to claim 1, wherein the update of the data is an update of software configuration data specific to a software implemented by the first equipment item, said software configuration data being recorded in a memory of the first radio frequency identifier.

9. The process of updating data according to claim 1, wherein the first radio frequency identifier is a RFID (Radio Frequency Identification) transponder.

10. The process of updating data according to claim 1, wherein the visual code read device and the second radio frequency identifier read-write interface comprised in the second equipment item form an active RFID transponder that can transmit radio waves to read and write digital data recorded in a RFID transponder comprised in the first equipment item.

11. The process of updating data according to claim 9 or 10, wherein the RFID transponder of the first equipment item and the active RFID transponder of the second equipment item are of a NFC (Near Field Communication) type.

12. A system to implement the process of updating data according to claim 1, the system comprising a first equipment item provided with a display screen and a first radio frequency identifier; a second equipment item provided with an image sensor and capable of transmitting some digital data to the first equipment item by a radio communication, the second equipment item comprising a second radio frequency identifier read-write interface device to update the digital data recorded in the first radio frequency.

13. The system according to claim 12, wherein the first equipment item is a photographic kiosk or a printer.

14. The system according to claim 12, wherein the second equipment item is a digital camera or a digital phonecam.

* * * * *